Patented Dec. 13, 1938

2,139,915

UNITED STATES PATENT OFFICE 2,139,915

DRIED FRUIT PROCESS AND PRODUCT

Henri Daniel Rey, Papeete, Tahiti, assignor to The Anglo California National Bank of San Francisco, trustee, San Francisco, Calif., a corporation No Drawing. Application March 14, 1936, Serial No. 68,885

7 Claims. (Cl. 99—204)

This invention relates to the drying and processing of fruits, and the principal objects of the invention are to provide improvements in the treatment of fruits in drying for the market whereby the fruits so dried or processed will be soft and pliable throughout, the residual juices will be more evenly distributed through the fruit bodies, and when drupaceous fruits are treated by the improved method the pits will be substantially free from the fleshy part of the fruits so as to be easily removed before or when eating the dried fruits without the necessity as at present of forcibly cutting, tearing or biting the pits from the flesh. Another advantage of the treatment is that fruits dried by the process are more unctuous and do not as readily dry out to a hard unyielding condition with long storage, or exposure to air, as do the dried fruits as now supplied for the market.

Other objects and advantages of the process will appear in the following description.

The process comprises preferably selecting well-ripened fruits which have their natural sugar content well developed; subjecting the fresh fruit to quick surface-drying in forced draft of normal air to at once reduce the moisture content to a point so as to prevent the formation of molds and spots. This is followed by drying in circulating heated air until the fruit bodies shrink somewhat and the flesh is firm.

After the above, the fruit is subjected to a rolling, kneading and squeezing process effected by any suitable mechanical apparatus until the cells within the fruit are well broken up or separated and the juices become evenly distributed throughout the fruit bodies. If the manipulative treatment is of a percussive nature the desired result is more readily produced.

After the above treatment the drying or curing is carried on by means of hot dry air, or in excessively dry climates by slightly moist hot air, until the fruit is reduced to about the moisture content generally obtaining in good grades of dried fruits of commerce.

The fruit is thereafter removed from the dryer and placed in closed rooms where the fruit is permitted to "sweat" for several days or more, to induce the remaining juices or syrups to flow of migrate to all parts of the flesh of the fruits and thereby contribute to its softness and pliability.

The temperature of the sweating room need not be other than normal, but the air should be humid, though in climates where the humidity is relatively high no moisture need be introduced.

After sweating, the fruit is removed and packed in the usual manner, though it is desirable to line the containers with waxed paper, or similar waterproof material.

The initial quick-drying step is preferably carried out in a suitable drying chamber with the fruit arranged in thin layers on stacked trays and the air is rapidly circulated through the chamber preferably at from about 70° to 90° F., though the exact temperature is not so important, as the object of the treatment is complete and copious aeration and quick removal of excess moisture to prevent initial bacterial action.

The next or hot air treatment may be carried out in the same apparatus, and the rapidly circulating air passing over and through the fruit is preferably heated to from about 100° to 120° F. and the treatment is maintained until the fruit shrinks materially and is firm enough (as determined by the nature of the fruit and the experience of the operator) to withstand the rolling, kneading, or manipulative step which follows. The principal requirement is that the exterior layers of the fruit bodies be rendered sufficiently firm and toughened by the rapid superficial drying and shrinking to avoid breaking and letting out the juices in the manipulative step.

The manipulation of the fruit may be carried out in any suitable apparatus or machine which will knead the individual pieces of fruit as by rolling in various directions under pressure, or squeezing the pieces back and forth in every conceivable direction and/or subjecting the fruit bodies to percussive action from every point, until they are completely softened and the pits inside, if any, have become entirely loosened. The longer this treatment can be maintained without rupturing the exteriors or permitting undue escape of the juices, the more completely will the principal objective of the present invention be attained.

The nature or specific construction of suitable mechanical equipment to carry out the previous step of the process is apart from the present invention which is directed to the process and product.

After the manipulative step above described, the sweating step is next in order, and has been adequately described, which step is not entirely new or novel apart from the combination of steps hereinbefore described.

While the process is best suited to the treatment of whole fruit bodies, and finds its greatest value with drupaceous fruits, yet it also has considerable value with pitted fruits, also halved fruits such as halved peaches, pears, and others, and as well with pineapples, bananas and other fruits, though such fruits may dispense with the initial cool air treatment and better be subjected directly to the warm or hot air treatment to reduce them to a sufficiently tough condition to withstand the manipulative step.

Fruits treated by the process described, especially such fruits as whole prunes, plums, cherries and other tough-skinned drupes, as well as raisins, exhibit a consistency quite surprising to one accustomed to the dried fruits of commerce, for the fruits of my process are soft and sponge-like at every point, yet unctuous and with the juices or syrups equally disseminated throughout so that there are no hard or dry spots anywhere. Besides, the skins are smooth and glossy even without any application of glycerine or other processing agent, yet the pliable soft characteristics persist even after long packing. The fact that in drupaceous fruits the pits are substantially free from the flesh is another sales point of great value.

Instead of carrying out the process with fresh fruits, it is possible to gain some of the advantages with fruits which have already been dried by the common process in the production of commercial dried fruit. For instance, commercial dried prunes, plums, cherries, and the like, or other common dried fruits of commerce, may be first subjected to a humid atmosphere and heat, or highly attenuated steam, until the fruit bodies are sufficiently softened to become amenable to the manipulative step of my process as above described, and then subjected thereto until the juices awakened by the treatment are worked evenly throughout the fruit bodies and the pits, if any, are released within as described. The result of this treatment is not entirely equal to the results achieved by carrying out the process with the fresh, tree-ripened fruit, but nevertheless marks an important improvement over the dried fruits as heretofore obtainable.

Having thus described my improved process and the unusual product derived therefrom, what I claim is:

1. The process of drying fruit which comprises evaporating the moisture from fresh fruit bodies until they are firm enough to stand kneading without substantial rupture of their external layers and exudation of their juices, then subjecting the fruit bodies to mechanical manipulative working or kneading until the cellular structure has become loosened up and the juices substantially distributed throughout the fruit bodies while maintaining their individuality, and in the case of drupaceous fruits the pits within the fruit bodies are substantially released from attachment to the flesh.

2. The process of drying fruit which comprises evaporating the moisture from fresh fruit until the bodies are firm enough to stand kneading without substantial rupture of their external layers and exudation of their juices, then subjecting the fruit bodies to mechanical manipulative working or kneading until the cellular structure has become loosened up and the juices substantially distributed throughout the fruit bodies while maintaining their individuality, and thereafter further drying the product to commercially dry condition.

3. The process of drying fruit which comprises evaporating the moisture from fresh fruit bodies until the individual bodies are firm enough to stand kneading without substantial rupture of their external layers and exudation of their juices, then subjecting the fruit bodies to mechanical manipulative working or kneading until the cellular structure has become loosened up and the juices substantially distributed throughout the fruit bodies, thereafter further drying the fruit bodies to commercially dry condition, then subjecting the dried fruit bodies to a curing or sweating confinement until the moisture is substantially evenly distributed, and thereafter packing the product.

4. In the process specified in claim 1, the initial drying process comprising the passage of large volumes of air over and around the fruit in layers for quickly reducing the moisture content to avoid mold formation, then continuing the air drying with circulating hot air until the fruit bodies are shrunken and toughened sufficiently for the manipulative step.

5. In the treatment of dried fruit, the step which comprises mechanically manipulating the partially dried fruit bodies, as by mechanical kneading, rolling, percussion, and squeezing, from various directions until the fruit bodies are uniformly soft and pliable while maintaining the individuality of the fruit bodies.

6. In the treatment of dried fruit, the step which comprises first moistening the dried fruit bodies, then mechanically manipulating the fruit bodies, as by mechanical kneading, rolling, percussion, and squeezing, from various directions until the fruit bodies are uniformly soft and pliable while maintaining their individuality.

7. In the drying of drupaceous fruit, the step which comprises mechanically manipulating partially dried fruit bodies, as by mechanical kneading, rolling, percussion, and squeezing, from various directions until the individual fruit boides are uniformly soft and pliable, and the pits within the bodies are substantially released from the flesh of the fruit, all while maintaining the individuality of the fruit bodies.

HENRI DANIEL REY.